United States Patent [19]
Gerpheide et al.

[11] Patent Number: 5,757,368
[45] Date of Patent: May 26, 1998

[54] SYSTEM AND METHOD FOR EXTENDING THE DRAG FUNCTION OF A COMPUTER POINTING DEVICE

[75] Inventors: George E. Gerpheide; Jack S. Kelliher; Everett D. Robinson, all of Salt Lake City, Utah

[73] Assignee: Cirque Corporation, Salt Lake City, Utah

[21] Appl. No.: 413,199

[22] Filed: Mar. 27, 1995

[51] Int. Cl.$^6$ ........................................ G06F 3/00
[52] U.S. Cl. .......................... 345/339; 345/157; 345/173
[58] Field of Search ........................ 395/155–161, 395/326–358; 345/156–160, 162–167, 117–120, 173–179, 180–183, 123–125

[56] References Cited

U.S. PATENT DOCUMENTS

| | | | |
|---|---|---|---|
| 3,857,092 | 12/1974 | Meyer | 324/662 |
| 3,886,311 | 5/1975 | Rodgers et al. | 178/18 |
| 4,032,841 | 6/1977 | Knippelmier | 324/678 |
| 4,071,691 | 1/1978 | Pepper, Jr. | 178/19 |
| 4,103,252 | 7/1978 | Bobick | 345/174 |
| 4,246,452 | 1/1981 | Chandler | 341/20 |
| 4,455,452 | 6/1984 | Schuyler | 345/174 |
| 4,476,463 | 10/1984 | Ng et al. | 345/174 |
| 4,495,485 | 1/1985 | Smith | 341/33 |
| 4,550,221 | 10/1985 | Mabusth | 345/173 |
| 4,587,378 | 5/1986 | Moore | 345/173 |
| 4,639,720 | 1/1987 | Rympalski et al. | 345/174 |
| 4,672,154 | 6/1987 | Rodgers et al. | 178/173 |
| 4,680,430 | 7/1987 | Yoshikawa et al. | 345/174 |
| 4,686,332 | 8/1987 | Greanias et al. | 345/173 |
| 4,698,641 | 10/1987 | Meadows et al. | 345/174 |
| 4,700,022 | 10/1987 | Salvador et al. | 341/158 X |
| 4,707,845 | 11/1987 | Krein et al. | 345/174 X |
| 4,736,191 | 4/1988 | Matzke et al. | 345/174 X |
| 4,740,781 | 4/1988 | Brown | 345/174 |
| 4,743,895 | 5/1988 | Alexander | 345/174 |
| 4,873,400 | 10/1989 | Rapp et al. | 341/33 X |

(List continued on next page.)

FOREIGN PATENT DOCUMENTS

| | | | |
|---|---|---|---|
| 0 299 204 A2 | 6/1988 | European Pat. Off. | G01D 5/251 |
| 56-132028 | 10/1981 | Japan | H03K 17/96 |
| 60-241112 | 11/1985 | Japan | G06F 3/03 |
| 60-192033 | 12/1985 | Japan | G06F 3/03 |
| 61-115118 | 6/1986 | Japan | G06F 3/03 |
| 91/03039 | 3/1991 | WIPO | G09G 3/02 |

OTHER PUBLICATIONS

PC Magazine "Best Products of 1994" Reprinted from Jan. 10, 1994 (one page).
Glidepoint® by Cirque Press References (one page), 1995 and 1994 references.
PC World "Pointers in the Right Direction" by Gene Smarte, Nov. 1994 (one page).

*Primary Examiner*—John E. Breene
*Attorney, Agent, or Firm*—Thorpe, North & Western, L.L.P.

[57] ABSTRACT

A method and system for extending the distance which a user can drag a cursor across a computer display device when using a touch sensitive pointing device as a relative cursor locating device. When such relative cursor locating devices are used the small perimeter size of the position sensing surface makes it inconvenient to carry out drag required functions. A border within the outer perimeter of the position sensing surface is defined and when a pointing object enters the border on the position sensing surface it is detected. It is then determined if the drag function is engaged for the cursor when the pointing object enters the border. If the drag function is engaged, the present invention holds the cursor at the location on the computer display while the user moves the pointing object to a new position on the position sensing surface from which position the user continues the dragging function to a desired end location on the computer display. Most preferably, a touch sensitive pointing device is utilized which allows a user to locate the cursor on the computer display using a single finger and emulate the click and drag functions of a mouse by tapping on the position sensing surface with a finger.

20 Claims, 7 Drawing Sheets

U.S. PATENT DOCUMENTS

| | | | |
|---|---|---|---|
| 4,922,061 | 5/1990 | Meadows et al. | 345/173 |
| 4,975,830 | 12/1990 | Gerpheide et al. | 395/500 X |
| 5,196,838 | 3/1993 | Meier et al. | 345/123 |
| 5,252,951 | 10/1993 | Tannenbaum et al. | 345/173 X |
| 5,305,017 | 4/1994 | Gerpheide | 345/174 |
| 5,309,555 | 5/1994 | Akins et al. | 395/157 |
| 5,327,161 | 7/1994 | Logan et al. | 345/173 |
| 5,333,247 | 7/1994 | Gest et al. | 395/155 X |
| 5,349,303 | 9/1994 | Gerpheide | 330/257 |
| 5,406,307 | 4/1995 | Hirayama et al. | 345/120 |
| 5,422,993 | 6/1995 | Fleming | 395/159 |
| 5,485,174 | 1/1996 | Henshaw et al. | 345/123 |
| 5,491,495 | 2/1996 | Ward et al. | 345/173 |
| 5,495,566 | 2/1996 | Kwatinetz | 385/157 |
| 5,506,951 | 4/1996 | Ishikawa | 395/157 |
| 5,528,260 | 6/1996 | Kent | 345/123 |
| 5,530,865 | 6/1996 | Owens et al. | 395/155 X |
| 5,543,590 | 8/1996 | Gillespie et al. | 345/174 X |

SYSTEM AND METHOD FOR EXTENDING THE DRAG FUNCTION OF A COMPUTER POINTING DEVICE

BACKGROUND

1. The Field of the Invention

This invention relates to computer pointing devices and accompanying methods used to control cursor movement on a display. More specifically, the present invention relates to touch sensitive input devices for data input to computers and other data utilizing devices.

2. The Background Art

Input devices for computers are well known in the art. There are several types of input devices including the ubiquitous and familiar "mouse." The mouse has become so popular because, when combined with a graphical user interface (GUI), it is so much easier to use than typed keyboard commands. The mouse has been accepted as a "user friendly" input device for both experienced and novice computer users. The popularity which the mouse has achieved in the art can be given large credit for fostering the explosive growth of the personal computer industry since a mouse provides a simple means for users to input data to a computer.

While mice are currently the most popular non-keyboard input device, a mouse generally requires a free-rolling surface, i.e. a table top, on which it can operate. Disadvantageously, a mouse is not well suited for use in cramped spaces or with a portable computer, particularly laptop, notebook, sub-notebook, and palmtop computers. In answer to the long existing need for a more convenient input device suitable for both portable and desktop computers, various alternative input devices have been proposed. Such alternative input devices include devices commonly referred to as track balls, track pens, track point devices, as well as various devices which sense the position of a pointing object on a position sensing surface. The devices which sense the position of a pointing object on a sensing surface generally have the advantages of being simple to use, being easily integrated with current computers and other computing devices, reliability, ruggedness, compactness, and the ability to be transported and used in a variety of locations.

Numerous types of input devices utilize a position sensing surface. Examples are provided in the following patent references: U.S. Pat. No. 3,886,311, Rodgers et al. (writing pen for detecting time varying electrostatic field produced by a writing tablet); U.S. Pat. No. 4,672,154, to Rodgers et al. (Cordless stylus which emits a directional electric field from the tip of a conductive pen cartridge sensed by a digitizer tablet having an X-Y coordinate system); U.S. Pat. No. 4,680,430 to Yoshikawa et al. (A tablet-like coordinate detecting apparatus including a resistive film for determining the coordinate position data of a point on a plane indicated by the touch of a finger tip or other load); U.S. Pat. No. 4,103,252 to Bobick (A position sensing tablet with electrodes located on the boundaries of a sensing region which detects a human touch by the change in capacitive charge caused by the touch which varies the time constant of an RC network which is part of an oscillator); U.S. Pat. No. 4,736,191 to Matzke (A touch activated control device comprising individual conductive plates wherein a user's touch on the dielectric layer overlaying the plates is detected by individually charging and discharging each of the sectors in the plates in a sequential manner to determine the increased capacitance of the sector); U.S. Pat. No. 4,550,221 to Mabusth (A touch sensitive control device which translates touch location to output signals and which includes a substrate that supports first and second interleaved, closely spaced, non-overlapping conducting plates); U.S. Pat. No. 4,639,720 to Rympalski et al. (An electronic sketch pad which contains a graphics input pad having an array of transparent capacitive pixels, the capacitance characteristics of which are changed in response to the passing of a conductive tipped stylus over the surface of the pad); and, European Pat. Publication No. 574,213 (A proximity sensor includes a sensor matrix array which senses changes in capacitance between horizontal and vertical conductors connected to the position sensing pad to determine x, y, & z position information).

A particularly useful and advantageous input device is disclosed in U.S. Pat. No. 5,305,017 to Gerpheide. The Gerpheide patent discloses devices and methods which overcome the drawbacks inherent in other devices which utilize a sensing tablet or sensing surface. The devices and methods of the Gerpheide patent include a touch sensitive input pad upon which a user conveniently inputs position information with a finger. In operation, the user's finger tip is brought in close proximity to the top surface of the position sensing surface of the touch sensitive pad. The device of the Gerpheide patent detects the position of the finger tip in the x and y directions of the touch pad as well as the finger's proximity in the z direction in relation to the sensing surface. In addition to a finger, the pointing object can be any other conductive object.

The above mentioned devices, as well as other devices which incorporate a position sensing tablet or surface, inherently have a drawback when certain functions are carried out.

Figure 1:
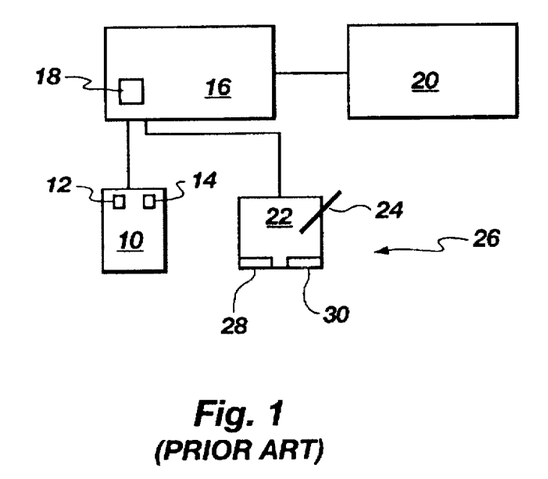
FIG. 1 is a block diagram representing available computer pointing devices.

Illustrated in FIG. 1 is a representation of a computer 16 to which is attached a mouse 10 which acts as a cursor locator input device. The mouse 10 generally includes two buttons 12 and 14 which are activated by the user to provide instructions to the computer 16. It is common for the computer to include a device driver 18, generally referred to as a software mouse driver 18, which interfaces the signals generated by the mouse 10 to the computer 16. The movement of the mouse 10 is translated into movement of a cursor on a display 20 connected to the computer 16 in real time. The mouse driver 18 can follow any of a number of protocols which are available in the industry. In many cases, it is desirable that any input device to be used with the computer 16 be compatible therewith. Alternatively, a cursor locating device can interface directly with the computer 16, for example via an operating system or some other technique which does not require a mouse driver.

In order to be compatible the computer 16, any input device must provide the "click" and "drag" functions which are also provided by the mouse 10. The click function entails depressing and releasing one of the mouse buttons 12 or 14. The click function may entail single, double, or triple clicking. The drag function entails moving the cursor over text or an object on the display 20, depressing a mouse button 12 or 14, keeping the mouse button depressed while "dragging" the text or object to a new location on the display 20, and releasing the mouse button to position the text or object on the new location on the display 20.

Also represented in FIG. 1 is a touch-sensitive positioning device, generally referred to at 26, which includes a position sensing surface 22 and a pointing object 24. Also represented are buttons 28 and 30 which emulate the functions of mouse buttons 12 and 14, respectively. When the touch-sensitive devices described in the above mentioned patents are used in place of a mouse 10, the drag and drop functions may be difficult or inconvenient to carry out.

In order to be practicably used with a portable computer, the sensing surface of any touch sensitive device must include only a small position sensing surface 22, for example anywhere from one by two inches up to three by five inches. Some touch-sensitive input devices are used as absolute cursor location devices in which the cursor is placed on the display 20 in the same relative location as the position of the pointing object on the touch-sensitive surface 22. When used as an absolute positioning device, however, the small touchpads make precise cursor location difficult and inconvenient for a user.

More typically, touch-sensitive devices are used as relative cursor positioning devices in which the cursor is moved across the display using one or more strokes across the position sensing surface 22. The movement of the cursor on the display 20 is scaled to the user's movement of the pointing object across the position sensing surface 22. In such circumstances, in order to move the cursor long distances (for example, completely across the display 20), the pointing object 24 must be repeatedly touched down, stroked across the position sensing surface 22, and lifted off from the position sensing surface 22. Even when the cursor is only moved a short distance, if a user starts the stroke near the edge of the position sensing surface 22, the user's pointing object 24 will hit the edge of the position sensing surface 22 before the desired new cursor location is reached. When performing a drag function the user must keep the pointing object 24 on the position sensing surface 22 until the new location for the cursor is reached to efficiently carry out the drag operation. When the pointing object 24 reaches the edge of the position sensing surface 22 and the user lifts the pointing object 24 off the position sensing surface 22, the drag operation will terminate and the text or object which was being dragged will immediately drop into whatever location it is at on the display 20. Furthermore, in accordance with some industry protocols, the text or object being dragged will snap back to its beginning location when the pointing object 24 is lifted from the sensing surface 22 after the pointing object has reached the edge of the sensing surface 22. It is very inconvenient and frustrating for the user to have the cursor drag operation unintentionally terminated in the described fashion.

One solution to the problems encountered with the drag and drop functions encountered when using a touch-sensitive input device is described in U.S. Pat. No. 5,327,161 to Logan et al. The method described in the Logan et al. patent detects when the pointing object 24 nears the edge of the position sensing surface 22 and, if the drag mode is engaged, movement of the cursor continues across the display 20 as if the user were still directing the movement through the touch pad. With the Logan et al. scheme, the cursor movement continues in the direction imparted to the cursor before the pointing object reached the edge of the position sensing surface 22. The cursor continues to skid across the display 20 until the user takes action to stop it such as pressing a button 28 or 30 or lifting the pointing object 24. While the scheme described in the Logan et al. patent allows a user to extend the drag function beyond the edge of the position sensing surface 22, disadvantageously, some users have difficulty learning the scheme and until the user becomes proficient at carrying out the scheme the user may find it awkward. Thus, it would be an advance in the art to provide a superior system and method for extending the drag function of a computer pointing device.

BRIEF SUMMARY AND OBJECTS OF THE INVENTION

In view of the above described state of the art, the present invention seeks to realize the following objects and advantages.

It is a primary object of the present invention to provide a system and method for extending the drag function of computer pointing device.

It is also an object of the present invention to provide a system and method for extending the drag function of a computer pointing device which is easy for a user to learn and carry out.

It is a further object of the present invention to provide a system and method for extending the drag and drop function of a computer pointing device which is particularly adapted for use with a touch sensitive pointing device.

It is another object of the present invention to provide a system and method for extending the drag function of a computer pointing device which is well suited for use with a touch sensitive pointing device which can operate with a user's finger as the only pointing object.

These and other objects and advantages of the invention will become more fully apparent from the description and claims which follow, or may be learned by the practice of the invention.

The present invention provides an advantageous method and system for extending the distance which a user can drag a cursor across a computer display device when using certain pointing devices. In particular, the present invention is beneficial when a touch sensitive pointing device, such as one which allows the user to move the cursor on the display by moving a stylus or finger upon a position sensing surface, is used as a relative cursor locating device. When such relative cursor locating devices are used, it is often difficult or inconvenient to carry out dragging of text and objects which appear on the computer display. Such touch sensitive pointing devices generally have a small position sensing surface and when the user reaches its outer perimeter the cursor will not move further on the display and the user must terminate the drag operation (which causes the object to drop wherever it happens to be located on the display) and start another movement on the position sensing surface to complete dragging operation.

In order to overcome this long-existing problem in the industry, the present invention defines a border within the outer perimeter of the position sensing surface. The method of the present invention then detects when the pointing object enters the border on the position sensing surface. It is then determined if the user is carrying out a drag operation (i.e. the drag function is engaged) when the pointing device enters the border. If a drag function is being carried out by the user, the present invention maintains the drag mode (causing the cursor to be held at the location on the computer display where it was when the pointing object entered the border) while the user moves the pointing device, e.g. stylus or finger, to a new position not within the border on the position sensing surface. The user then continues the dragging function from where the cursor is held on the computer display to a desired end location on the computer display as the user moves the pointing device from the new position to an end position on the position sensing surface.

The present invention also desirably allows the time which the drag mode will be maintained (i.e. the time which the cursor will be held while the user moves the pointing object) to be varied for the convenience of the user. The present invention also preferably maintains the drag mode until some action of the user, such as the user releasing the drag function or the user employing a click function, is carried out.

Most preferably, the present invention utilizes a touch sensitive pointing device which allows a user to locate the cursor on the computer display using a single finger and emulate the click and drag functions of a mouse by tapping on the position sensing surface with a finger.

BRIEF DESCRIPTION OF THE DRAWINGS

In order to better appreciate how the above-recited and other advantages and objects of the invention are obtained, a more particular description of the invention briefly described above will be rendered by reference to specific embodiments thereof which are illustrated in the appended drawings. Understanding that these drawings depict only a typical embodiment of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Reference will now be made to the drawings wherein like structures will be provided with like reference designations.

Figure 2:
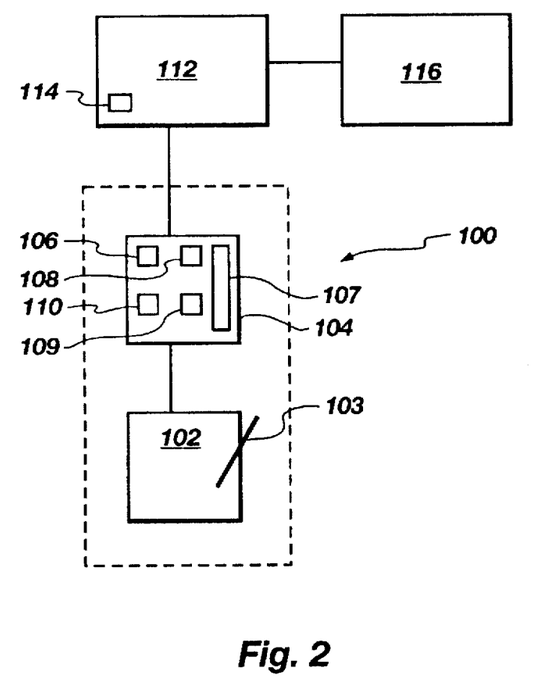
FIG. 2 is a block diagram representing the structure of a particular embodiment of the present invention described herein.

Reference will next be made to FIG. 2 which is a block diagram representing one presently preferred embodiment of the present invention. It will be appreciated that the present invention may be embodied in specific forms other than those described herein. The described embodiments are, however, the those presently preferred for carrying out the present invention.

Represented in FIG. 2 is a touch sensitive pointing device 100 which includes a touch pad 102 and an interface circuit 104. The touch pad 102 has a position sensing surface which senses the position of a pointing object 103, such as a stylus or a user's finger, which is manipulated by the user. The interface circuit 104 includes those components, whether embodied in software, firmware, or hardware, which are necessary to interpret the position information obtained from the touch pad 102 to industry standard signals understandable by the computer 112. The computer 112 may include a component or driver 114, for example a mouse driver, or some other cursor positioning utility to interpret the signals received from the touch pad 102. Alternatively, those skilled in the art can arrive at many other techniques for the touch pad to communicate with the computer 112.

It is particularly preferred that the touch sensitive pointing device which is described in U.S. Pat. No. 5,305,017 be used with the present invention. The touch sensitive pointing device described in U.S. Pat. No. 5,305,017 is particularly advantageous in that the cursor positioning, clicking, and dragging functions can all be accurately carried out by a user using only a single finger as a pointing object. Other advantages of the touch sensitive pointing device described in U.S. Pat. No. 5,305,017 are described therein or will be apparent from use of the invention. U.S. Pat. No. 5,305,017 is now incorporated herein by reference in its entirety. Using the information set forth in U.S. Pat. No. 5,305,017 and the information set forth herein, a system for carrying out the present invention can be readily arrived at by those skilled in the art. Importantly, the present invention is readily adaptable for use with numerous other pointing devices such as those mentioned earlier The touch sensitive pointing device 100 of the present invention is connected to the computer 112. The computer 112 is connected to a display 116 upon which various text and other objects are displayed and a cursor is located. The components of the interface circuit 104 will be described shortly.

Figure 3A:
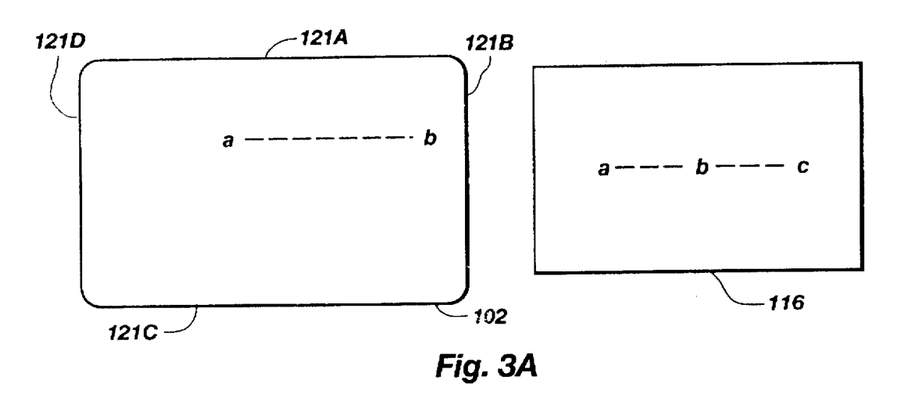
FIGS. 3A-C are diagrams showing the operation of the embodiment of the present invention described herein.
Figure 3B:
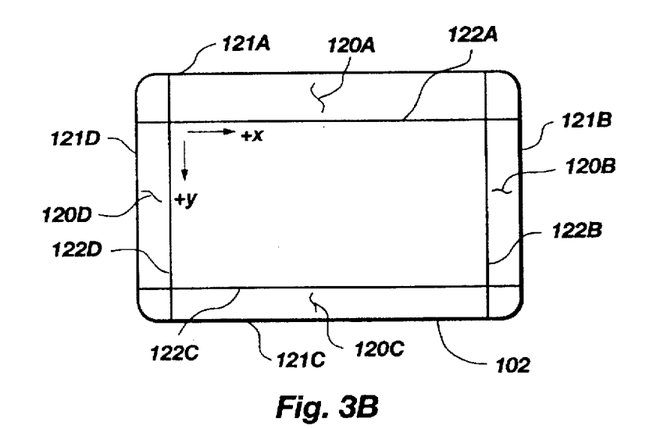
Figure 3C:
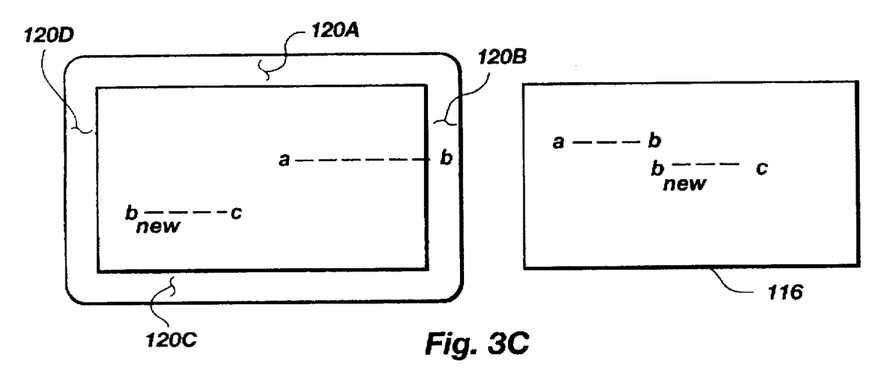

Reference will next be made to FIGS. 3A-C to explain the drag extend function of the present invention. FIG. 3A is a representation of the touch pad 102 which has four edges 121A-D which will be referred to herein as a top edge 121A, a right edge 121B, a bottom edge 121C, and a left edge 121D. While the represented touch pad 102 is preferred for use with the present invention, it will be appreciated that touch pads of different shapes and configurations can also be used. Moreover, other cursor locating devices, such as tablets and those exemplary devices mentioned earlier, also benefit from the present invention.

Also represented in FIG. 3A is the display 116. In this example of the present invention, the touch pad 102 serves as a relative cursor locating device. Illustrated in the display 116 are three cursor positions a, b & c. Cursor position a represents a beginning cursor location. Cursor position c represents a desired ending cursor location. On the touch pad 102 location a represents the beginning position of a pointing object, such as a stylus or a user's finger, and the position where the user begins the drag operation intending to move text or other object to the desired location c on the display. Since the touch pad is being used as a relative cursor positioning device, disadvantageously, when the user moves the pointing object to position b at the right edge 121B of the touch pad 102, the cursor has only reached corresponding location b on the display 116. The user must then lift the pointing object from the surface of the touch pad 102, which without the present invention, would cause the drag operation to terminate. In some instances, lifting the pointing object would even cause the cursor to snap back to the beginning position a. It is to be understood that even though a pointing object is not explicitly represented in FIGS. 3A-C, the pointing object may be a user's finger or any other appropriate object.

Reference will be made next to FIG. 3B which is a further representation of the touch pad 102. In accordance with the present invention, border areas 120A–D are defined adjacent to each edge 121A–D of the touch pad 102. The respective limits of the border areas 120A–D are represented by the lines 122A–D. As is understood in the art, any position on the touch pad 102 can be defined by an x,y coordinate, with both values expressed as positive values as suggested in FIG. 3B. As will be explained shortly, it is preferred that the touch pad 102 of the present invention also provide a vertical z component to determine if the pointing object is present on the surface of the touch pad 102. It is preferred that the present invention utilize the pointing object making appropriate "taps" on the surface of the touch pad 102 to invoke the click and drag functions which must be provided. Obtaining z position information which can be used to carry out such "tap" functions is described in U.S. Pat. No. 5,305,017 but alternative methods, such as mechanical or touch sensitive buttons, can be used within the scope of the present invention to access the click and drag functions.

Reference will next be made to FIG. 3C which is a representation of the touch pad 102 and the display 116 with a preferred embodiment of the present invention operating therewith. With the present invention in operation, as will be described in further detail shortly, when a user desires to move the cursor from position a to position c on the display 116, the user begins the movement of the pointing object on the touch pad 102 at location a on the touch pad 102 by engaging the drag mode. As the user moves the pointing object to position b within boundary 102B, the drag mode is maintained (which causes the cursor to be held at position b on the display 116) while the user lifts the pointing object from the surface of the touch pad 102. The user moves the pointing object to a new position on the surface of the touch pad 102, for example to position $b_{new}$, and continues to stroke the touch pad 102 in the desired direction. The cursor, which was held at position b on the display 116, now continues to move to the desired cursor position c on the display 116. Once the cursor reaches the position c, the user releases the drag function as explained earlier. Releasing the drag function can, for example, cause the text or object (not represented in FIG. 3C) to be dropped at position c.

Most beneficially, the present invention allows the user to reposition the pointing object anywhere on the touch pad 102, including within the borders 120A–D, and continue the drag operation in any direction. Moreover, the present invention will allow a user to utilize multiple strokes across the touch pad 102 while maintaining the drag mode each time a border 120A–D is entered. Thus, when the output of the touch sensitive pointing device 100 is scaled to require many strokes across the surface of the touch pad 102 to cross the display 116 (in order to provide very accurate cursor locating) the user can repeatedly stroke the touch pad while the drag mode is engaged without interruption as the cursor slowly moves across the display 116. Still further, when working with documents or spread sheets so large that only a small portion can be windowed on the display 116 at one time, the present invention's feature of allowing multiple strokes across the touch pad 102 while maintaining the drag mode is a great benefit.

In the described fashion, the present invention advantageously allows a user to extend the drag function of a computer pointing device in a manner not previously known or suggested. The present invention allows the user to extend the drag function easily, conveniently, and without requiring long practice or accustomization to the method or apparatus.

Figure 4:
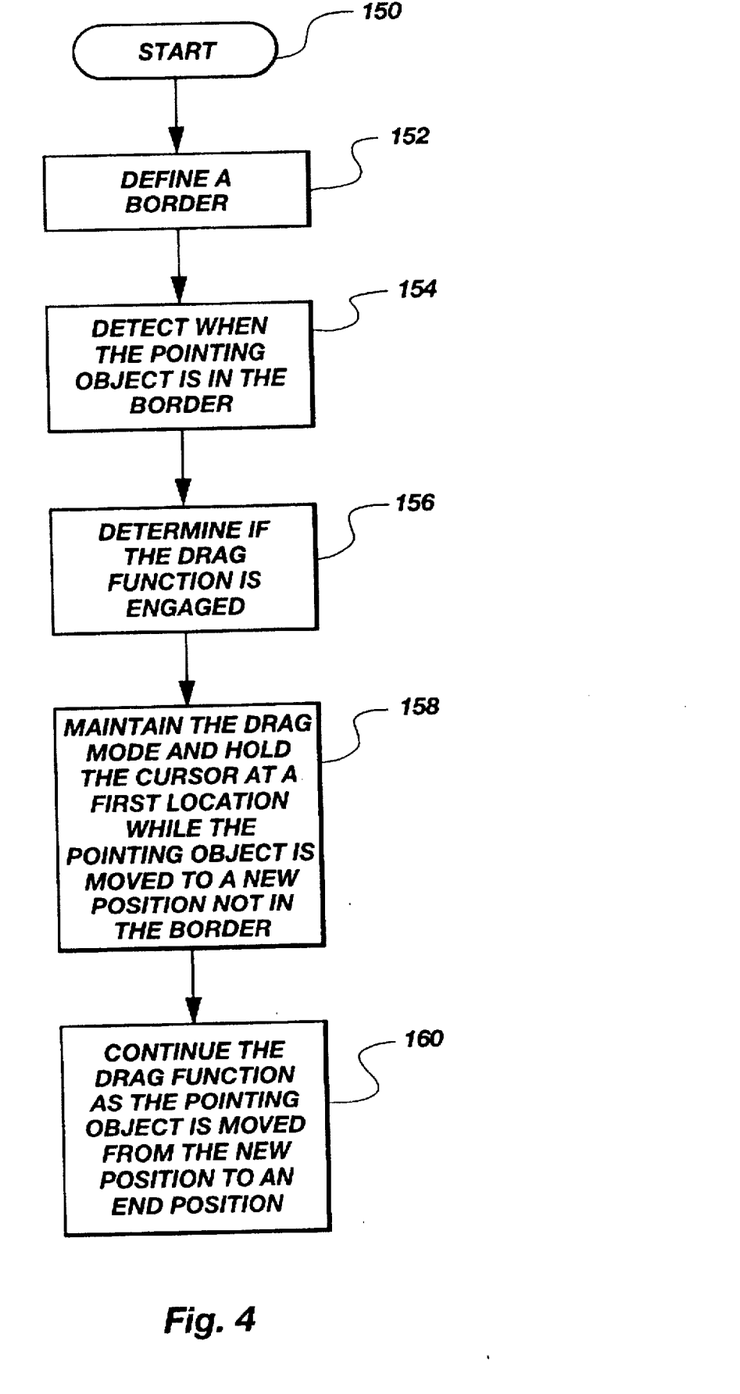
FIG. 4 is a flow chart showing the principle steps carried in accordance with the present invention.

Reference will next be made to FIG. 4 which is a flow chart showing the principle steps carried out in accordance with the present invention. The flow chart of FIG. 4 starts at 150 and illustrates one preferred method of the present invention. A border area is defined at step 152. At step 154, the touch pad (102 FIGS. 3A–C) and associated structures detect when the pointing object is within the border (120A–D). It will be appreciated that those skilled in the art can arrive at many different methods and structures to determine when the pointing object is on, near, or in the border.

At step 156 it is determined if the drag function is engaged. If the drag function is engaged (step 156), and the pointing object is within the border (step 154), in accordance with the present invention and as shown at step 158, the drag mode is maintained and the cursor is held at a first location. For purposes of this explanation, the first location is the location of the cursor on the display when the pointing object was lifted off from the touch pad 102. The drag mode is maintained and the cursor is held at the first position on the display (116 in FIGS. 3A–C) while the user moves the pointing object to another position on the touch pad 102. At step 160, the drag function continues so that the cursor continues to move on the display 116 as the user moves the pointing object from the new position on the touch pad 102 to an end position. In this explanation, the end position corresponds to the desired location of the cursor on the display 116.

It will be appreciated that any method or structure which functions to hold the cursor in a location on a real-time display while the user repositions a pointing object to another position on a position sensing surface and then allows the cursor movement to continue from the location on the display as the user continues movement of the pointing object, all while maintaining the drag mode, is intended to fall within the scope of the present invention.

Reference will next be made to FIGS. 5–8 which provide further information regarding preferred embodiments of the present invention. Using the information set forth herein, those skilled in the art will be able to readily arrive at many different arrangements of software, firmware, and/or hardware which will carry out the present invention.

Figure 5:
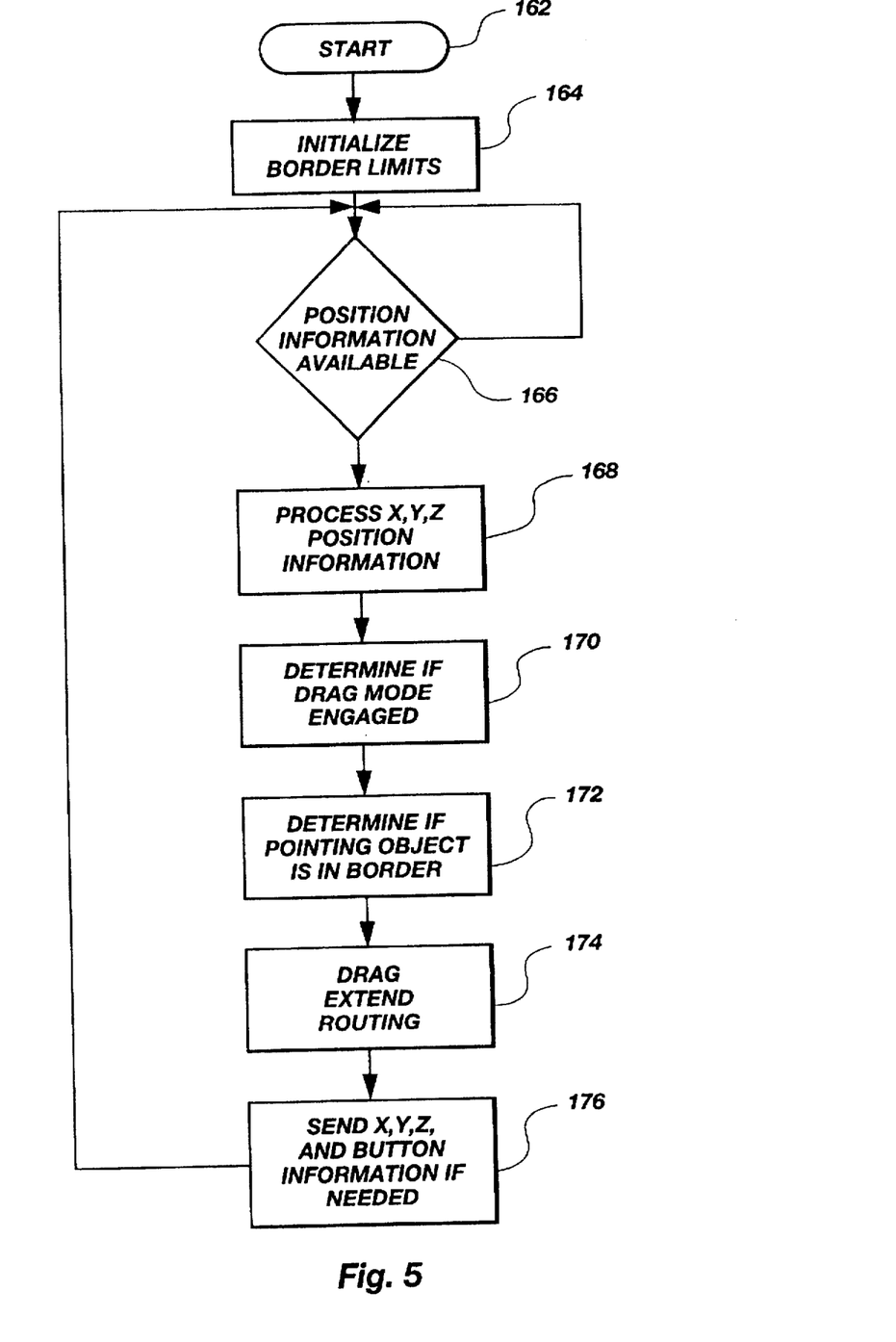
FIG. 5 is a flow chart showing particular steps carried out by the embodiment of the present invention described herein.

In the flow chart of FIG. 5, beginning at start 162, the border limits (122A–D in FIG. 3B) are initialized. Desirably, the positions of border limits (122A–D) can be altered by the user and each of the border limits (122A–D) can be initialized differently by the user. Importantly, it is within the scope of the present invention to size and position the borders (120A–D in FIG. 3B) anywhere on the touch pad (116 in FIG. 3B) to create a border of any shape or size in accordance with the needs and desires of the user.

At step 166, the method waits in a loop until position information is available from the touch pad (102 in FIGS. 3A–C) or other position sensing device. If position information is available from the touch pad 102, at step 168 the x, y, z position information is processed. In the present invention, it is most preferred that the click and drag functions be invoked by the user tapping on the surface of the touch pad 102. In its most preferred embodiment, the present invention allows a user to tap once to invoke a click function, tap twice to invoke a double click function, and tap once immediately followed by holding the pointing object against the surface of the touch pad (102 in FIGS. 3A–C) to invoke the drag function. If the user lifts the pointing object off the touch pad (102 in FIGS. 3A–C) outside of the borders (120A–D in FIG. 3B), the drag mode ends. At step 170, whether the drag mode is engaged is determined. Further information regarding the steps used to determine if the drag mode is engaged and whether the drag mode should continue is set forth in FIG. 6 which will be discussed shortly.

At step 172, the method next determines if the pointing object is in the border (120A–C in FIG. 3B) as will be further discussed in connection with FIG. 7. At step 174 the drag extend mode is activated as will be further discussed in connection with FIG. 8. Next, at step 176, the x, y, z and button information is sent to the computer 116 for processing, for example by a mouse driver 114 which is resident in the computer 112. The method then loops back to step 166 and continues processing.

Figure 6:
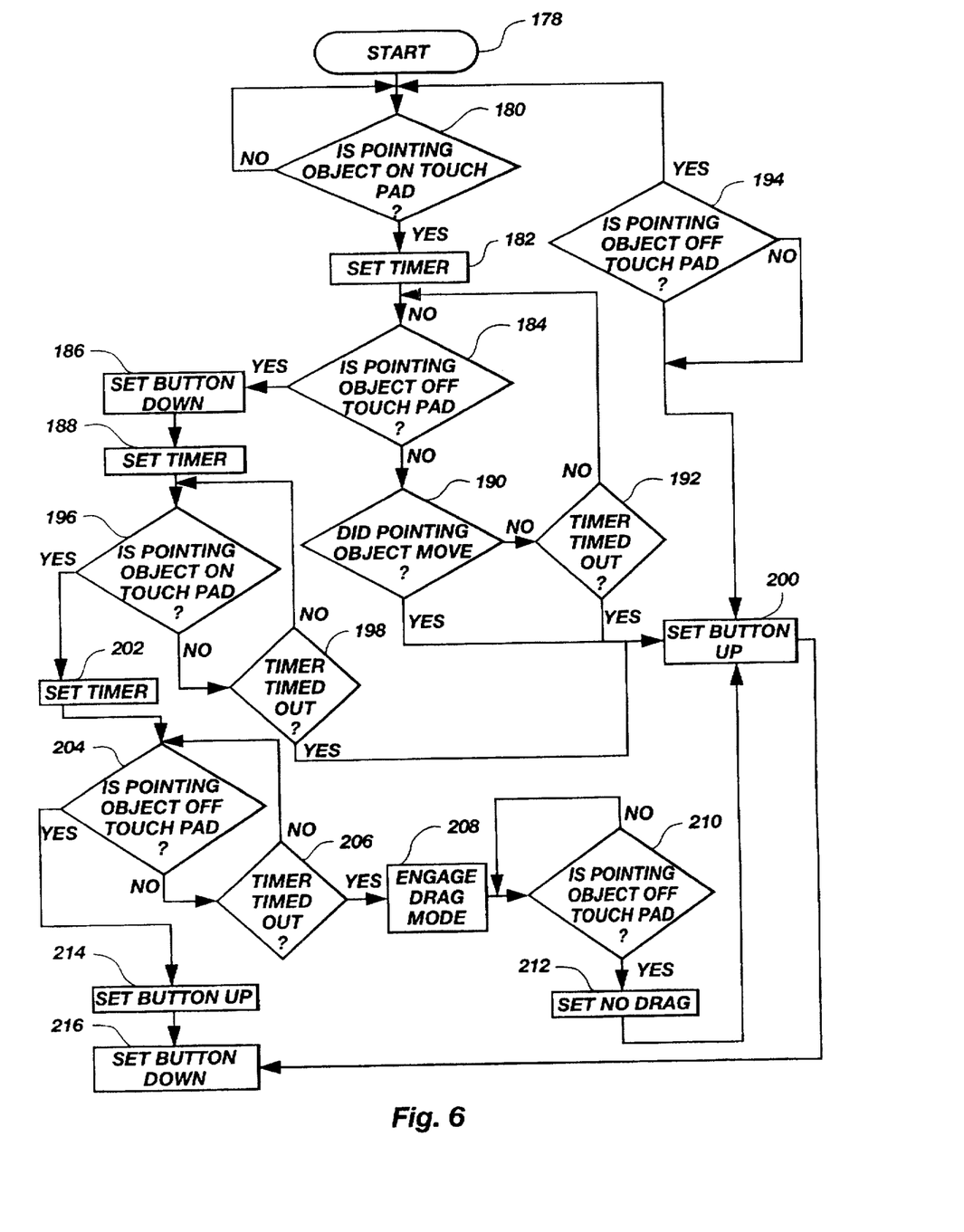
FIG. 6 is a flow chart showing the steps carried out by the embodiment of the present invention described herein to determine if the drag mode should be entered.

Reference will next be made to the flow chart of FIG. 6 to describe the most preferred method for determining whether the drag mode is engaged as mentioned at step 170 in FIG. 5. Starting at 178, the method determines at step 180 if a pointing object is on the touch pad (102 in FIGS. 3A–C). If a pointing object is on the touch pad 102, a timer is set at step 182. The length of the timer can beneficially be altered by the user to accommodate different preferences. At step 184 the method determines if the pointing object is off the touch pad 102. If the pointing object is not off the touch pad 102, the method proceeds to step 190 and it is determined if the pointing object moved on the touch pad 102. If the pointing object did not move on the touch pad 102, the method determines if the timer has timed out at step 192. If the timer has timed out at step 192, the method returns to step 184; If the timer has not timed out at step 192, the method proceeds to step 200 where a button up signal is set. Also, if the pointing object moved at step 190, the method also proceeds to step 200 where a button up signal is set.

Returning again to step 184, if the pointing object is off the touch pad at step 184, the method sets a button down signal at step 186 and a timer is set at step 188. At step 196, the method determines whether a pointing object is on the touch pad (102 in FIGS. 3A–C). If the pointing object is on the touch pad 102, the method determines if the timer (step 188) has timed out at step 198; If the timer has not timed out at step 198 the method loops back to step 196. The method proceeds to step 200 if the timer (step 188) has timed out.

If at step 196 it is determined that the pointing object is on the touch pad (102 in FIGS. 3A–C), the method proceeds to step 202 and sets a timer. After step 202, the method proceeds to step 204 and determines if the pointing object is off the touch pad 102 and if so, the method sets a button up signal (step 214), proceeds through a set button down routine (step 216), and then proceeds to step 200 and sets a button up signal.

If at step 204 it is determined that the pointing object is not off the touch pad (102 in FIGS. 3A–C), the method proceeds to step 206 and determines if the timer set in step 202 has timed out. If the timer has not timed out at step 206, the method loops back to step 204. If the timer has timed out at step 206, the method proceeds to step 208 and the method engages the drag mode. At step 210 the method determines if the pointing object is off the touch pad 102. If the pointing object is not off the touch pad 102, the method waits in a loop at step 210. If the pointing object is off the touch pad 102, the method proceeds to step 212 where a set no drag routine is executed followed by step 200 which sets a button up signal. From step 200, the method again determines if the pointing object is off the touch pad 102. If the pointing object is not off the touch pad 102, the method waits by looping back on step 194. If the pointing object is off the touch pad 102 the method returns back to step 180. The foregoing method provides that the user can conveniently perform click functions and engage the drag function using taps with a single finger or with another appropriate pointing object.

It will be appreciated that the present invention provides the signals which are required by an industry standard mouse driver (114 in FIG. 2) and can emulate a mouse device. The present invention can also communicate with the computer (112 in FIG. 2) in a variety of other ways which are now available or which may become available in the future. The present invention also most preferably allows the user to engage the drag mode, as well as perform clicking operations, without pushing any buttons. Still, the present invention provides advantages not previously available with a touch sensitive pointing device, regardless of whether buttons must or need not be used to invoke and engage the click and drag functions.

Figure 7:
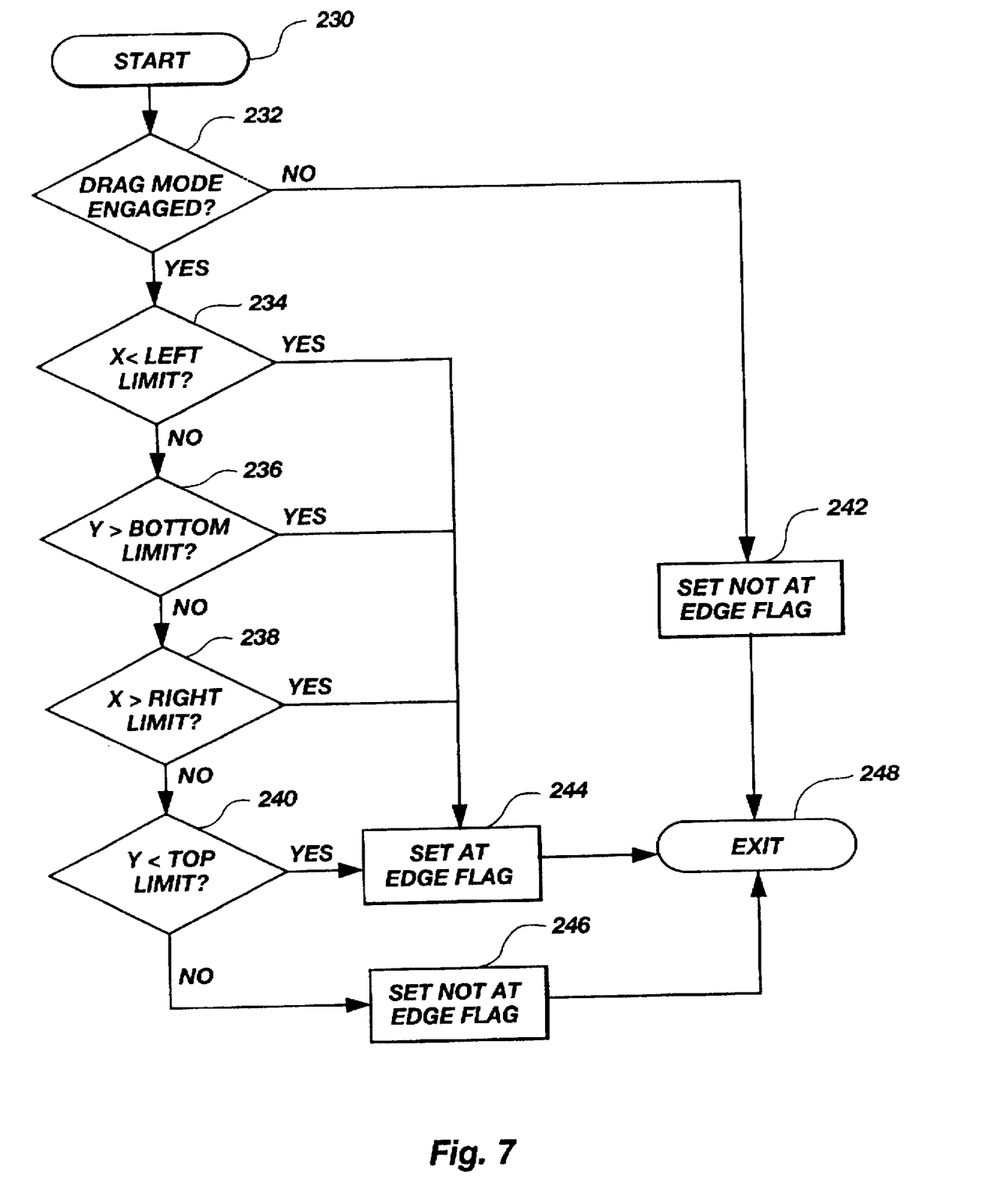
FIG. 7 is a flow chart showing the steps carried out by the embodiment of the present invention described herein to determine if the user has moved the pointing object to a border of a touch sensitive pad.

Reference will next be made to FIG. 7. FIG. 7 is a flow chart illustrating the preferred method of the present invention to determine if the pointing object is within a border (120A–D in FIG. 3B) as mentioned earlier at step 172 of FIG. 5. Starting at 230, the method determines if the drag mode is engaged at step 232. If the drag mode is not engaged, a set not at edge flag routine is performed at step 242 and the method exits at step 248.

If the drag mode is engaged at step 232, the method determines if the x position of the pointing object is less than the left limit 122D (step 234), if the y position of the pointing object is greater than the bottom limit 122C (step 236), if the x position of the pointing object is greater than the right limit 122B (step 238), or the y position of the pointing object is less than the top limit 122A, then the method proceeds to step 244 and an at edge flag is set and the method exits at step 248. If the method determines that the x position of the pointing object is not less than the left limit 122D (step 234), if the y position of the pointing object is not greater than the bottom limit 122C (step 236), if the x position of the pointing object is not greater than the right limit 122B (step 238), or the y position of the pointing object is not less than the top limit 122A, then the method proceeds to step 246 and a not at edge flag is set and the method exits at step 248. In the described fashion, the method of the present invention efficiently determines if the pointing object is in a border.

Figure 8:
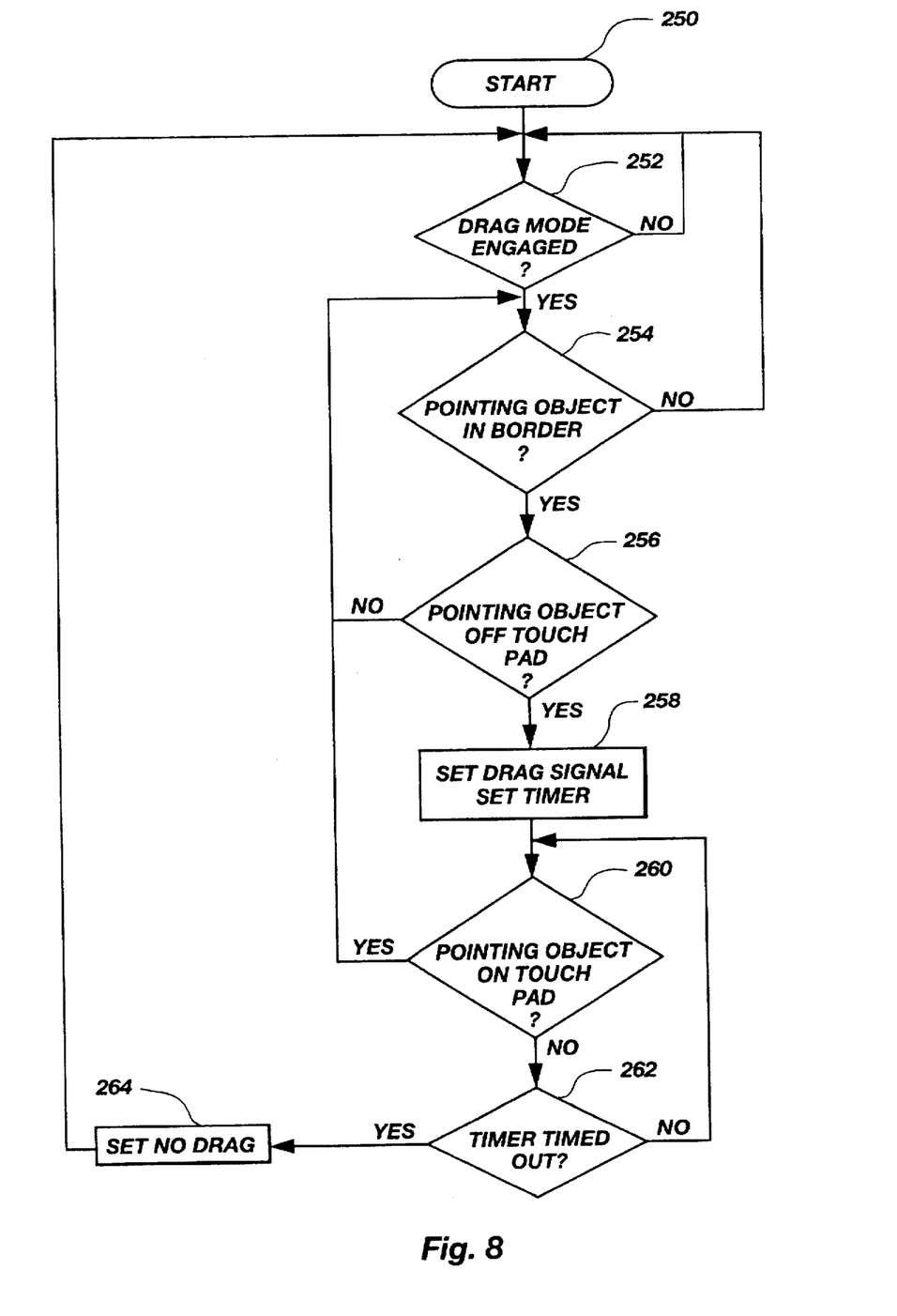
FIG. 8 is a flow chart showing the steps carried out by the embodiment of the present invention described herein to extend to drag mode beyond the edge of the position sensing surface.

Reference will next be made to FIG. 8. FIG. 8 is a flow chart illustrating the preferred method to extend the drag mode beyond the edge of the position sensing surface of the touch sensitive pointing device 100 and is an example of the drag extend routine indicted at step 174 in FIG. 5. Starting at 250 in FIG. 8, the method first determines if the drag mode is engaged at step 252. If the drag mode is not engaged, the method waits in a loop at step 252. If the drag mode is engaged, the method next determines if the pointing object is in the border (120A–D in FIG. 3B). If the pointing object is not in the border, the method returns to step 252. If at step 254 it is determined that the pointing object is in the border, the method determines if the pointing object is off the touch pad 102 at step 256. If the pointing object is not off the touch pad 102, the method returns to step 254. If the pointing object is off the touch pad at step 256, the method proceeds to step 258 where a drag signal is set and a timer is set. It is presently preferred that the timer be set for a period of two seconds but it is preferred that the time be adjustable to meet the desires of the user.

It is preferred that the periods of all of the timers described in connection with FIGS. 6–8 be user adjustable. The period of the timer set at step 258 determines how long a use will have to move the pointing object from one of the borders 120A–D to a new position on the touch pad 102 as explained in connection with FIG. 3C. After step 258, the method determines if the pointing object is on the touch pad 102 and, if so, the method returns to step 254. If it is determined at step 260 that the pointing object is not on the touch pad 102, the method proceeds to step 262 where it is determined if the timer (step 258) has timed out. If the timer has not timed out at step 262, the method returns to step 260. If the timer has timed out at step 262, the method proceeds to step 264 and a no drag signal is set at step 264 and the method returns to step 252.

In the described fashion, the preferred method of the present invention allows a user to extend the drag function of a pointing device beyond the edge of the touch pad 102. Reference will now to made again to FIG. 2 which is a block diagram representing one presently preferred system of the present invention. From the forgoing description, it will be appreciated that the method of the present invention can be embodied in many different apparatus and systems. Depending upon the application to which the present invention is to be employed, the present invention may be embodied as software, firmware, hardware, or a combination of the foregoing.

Represented in the interface circuit 104 of FIG. 2 at 107 is a position detection means which performs the functions necessary to use the touch pad. Also depicted in FIG. 2 are structures which carry out the present invention in cooperation with the position sensing structures. Using the information set forth herein, it will be appreciated that the integration of the present invention into any number of cursor locating devices, both those presently available and those available in the future, can be readily accomplished by those skilled in the art, including the fabrication of any components and the creation of any necessary programming code.

Shown in FIG. 2 at 106 is a means for detecting when the pointing device is on the edge of the border or beyond. Also represented at 108 is a means for activating a drag function. Represented at 110 in FIG. 2 is a means for maintaining the drag mode and holding the cursor at a first location on the display. Also depicted in FIG. 2 at 109 is a means for continuing the dragging function from the first location on the display to a second location on the display. Importantly, the described structures can be embodied in many different forms, for example in a single integrated circuit. It is to be understood that any structures performing functions equivalent to the methods of the present invention are to be considered within the scope of the system of the present invention.

In view of the foregoing, it will be appreciated that the present invention provides a system and method for extending the drag function of computer pointing device which is reliable and easy to use. The present invention also provides a system and method for extending the drag function of a computer pointing device which is particularly adapted for use with a touch sensitive pointing device and which can operate with a user's finger as the only pointing object.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for extending the cursor dragging function of a pointing device used to control the movement of a cursor on a computing output device, the pointing device otherwise requiring continuous contact by a human digit of a user in a dragging position to maintain engagement of the cursor dragging function of the pointing device, the method comprising the steps of:

defining a border area which is less than the maximum distance which can be traveled by a pointing object manipulated by the user;

detecting when the pointing object is on the edge of the border or beyond;

determining if the drag function is engaged when the pointing object enters the border;

maintaining the dragging function as the human digit is removed from its dragging position;

continuing the drag function and holding the cursor at a first location on the computing output device while the pointing object is moved to a new position using the pointing device;

continuing the dragging function as the human digit is again applied to the dragging position; and continuing the dragging function from the first location on the computing output device to a second location on the computing output device as the pointing object is moved from the new position to an end position.

2. A method as defined in claim 1 wherein the step of holding the cursor at a first location comprises the step of holding the cursor at the first location for a predetermined period of time before disengaging the drag function.

3. A method as defined in claim 1 wherein the new position is not within the border.

4. A method as defined in claim 1 further comprising the steps of:

maintaining the drag function and holding the cursor at a third location on the computing output device while the pointing object is moved to another new position; and continuing the dragging function from the third location on the computing output device to a fourth location on the computing output device as the pointing object is moved from the another new position to a final position.

5. A method as defined in claim 1 wherein the step of holding the cursor at a first location comprises at least one step selected from the group consisting of:

holding the cursor at the first location for a predetermined period of time;

holding the cursor at the first location until the drag function is released; and holding the cursor at the first location until a click function is activated.

6. A method as defined in claim 1 wherein the pointing device comprises means for sensing the position of at least one finger upon a sensing surface.

7. A method as defined in claim 1 wherein the first location is the location of the cursor when the pointing object was lifted off the border.

8. A method as defined in claim 1 wherein the step of determining if the drag function is active comprises the step of determining the number of taps of at least one finger of the user upon the sensing surface and wherein the method further comprises varying the time which the cursor is held at the first location.

9. A method as defined in claim 1 wherein the step of defining a border comprises:

defining a first border separated by a first distance from the maximum distance and within the maximum distance;

altering the first distance;

defining a second border, adjacent to the first border, separated by a second distance from the maximum distance and within the maximum distance;

altering the second distance;

defining a third border, adjacent to the second border, separated by a third distance from the maximum distance and within the maximum distance;

altering the third distance;

defining a fourth border, adjacent to the third border, separated by a fourth distance from the maximum distance and within the maximum distance, and altering the fourth distance.

10. A method for extending the distance which a user can drag a cursor across a display which responds to user input in real time, the user employing a pointing object whose position is detected by a position sensing surface having a perimeter, the cursor following the movement of the pointing object upon the position sensing surface but the cursor not moving further once the pointing object reaches the perimeter of the sensing surface, dragging of the cursor across the display otherwise requiring the pointing object to be in contact with the sensing surface, the method comprising the steps of:

defining a border within the perimeter of the position sensing surface;

detecting when the pointing object enters the border of the position sensing surface;

determining if the drag function is active for the cursor when the pointing object enters the border;

maintaining the drag function as the pointing object is removed from the position sensing surface;

holding the cursor at a first location on the display device, the first location being the location of the cursor when the pointing object entered the border, while the pointing object is moved to a new position;

continuing the drag function of the cursor as the pointing object is applied again to the position sensing surface; and continuing the drag function from the first location on the display device to a second location on the display device as the pointing object is moved from the new position to an end position on the position sensing surface.

11. A method as defined in claim 10 wherein the step of holding the cursor at a first location comprises the step of holding the cursor at the first location for a predetermined period of time before releasing the cursor.

12. A method as defined in claim 10 wherein the step of holding the cursor at a first location comprises at least one step selected from the group consisting of:

holding the cursor at the first location for a predetermined period of time;

holding the cursor at the first location until the drag function is released; and holding the cursor at the first location until a click function is activated.

13. A method as defined in claim 10 wherein the pointing device comprises means for sensing the position of at least one finger upon a position sensing surface.

14. A method as defined in claim 10 wherein the step of determining if the drag function is active comprises the step of determining the number of taps of at least one finger upon the position sensing surface.

15. A method as defined in claim 10 wherein the step of defining a border comprises:

defining a first border separated by a first distance from the maximum distance and within the maximum distance;

altering the first distance;

defining a second border, adjacent to the first border, separated by a second distance the maximum distance and within the maximum distance;

altering the second distance;

defining a third border, adjacent to the second border, separated by a third distance from the maximum distance and within the maximum distance;

altering the third distance;

defining a fourth border, adjacent to the third border, separated by a fourth distance from the maximum distance and within the maximum distance; and altering the fourth distance.

16. A system for extending the cursor dragging function of a pointing device used to control the movement of a cursor on a display, the system comprising:

sensing surface means for sensing the position of a pointing object thereon, the sensing surface having a perimeter;

means for detecting when the pointing object is within a border distance from the perimeter on the sensing surface means;

means for activating a drag function of the cursor which is engaged by continuous dragging action of a user;

means for holding the cursor at a first location on the display when the pointing object is within the border distance from the perimeter on the sensing surface and the user ceases the dragging action and while the pointing object is moved to a new position on the sensing surface means; and means for maintaining the dragging function until the user continues the dragging action from the first location on the display to a second location on the display as the pointing object is moved from the new position to an end position on the sensing surface means.

17. A system as defined in claim 16 wherein the sensing surface means comprises a touch pad means.

18. A system as defined in claim 16 wherein the pointing object is a human finger.

19. A system as defined in claim 16 further comprising means for interfacing the sensing surface means with a mouse driver.

20. A system as defined in claim 16 further comprising:

mouse driver means;

means for interfacing the sensing surface means with the mouse driver means;

computer means for processing information received from the mouse driver means and other input devices;

display means, connected to the computer means, for displaying in real time the cursor in the location indicated by the mouse driver.

* * * * *